H. F. SHAW & G. F. SHAW.

Improvement in Rotary-Shears.

No. 128,759.

Patented July 9, 1872.

128,759

UNITED STATES PATENT OFFICE.

HENRY F. SHAW AND GEORGE F. SHAW, OF WEST ROXBURY, MASS.

IMPROVEMENT IN ROTARY SHEARS.

Specification forming part of Letters Patent No. 128,759, dated July 9, 1872; antedated June 22, 1872.

*To all whom it may concern:*

We, HENRY F. SHAW and GEORGE F. SHAW, of West Roxbury, in the county of Norfolk and State of Massachusetts, have invented a certain new and useful Cutting Device, of which the following is a specification:

*The Nature and Object of Invention.*

The nature of our invention consists in arranging as a cutter, in connection with a stationary blade, an elliptical ring or hoop cut from a circular cylinder, the plane of the ring being inclined to the axis of the cylinder. This cutting-ring revolves on an axis which would coincide with the cylindrical axis, so that all parts of the cutting-edge of the ring are equidistant radially from the axis about which it revolves. This device is especially adapted to cutting lawn-grass, but may be applied to any analogous use.

*Description of the Accompanying Drawing.*

Figure 1:
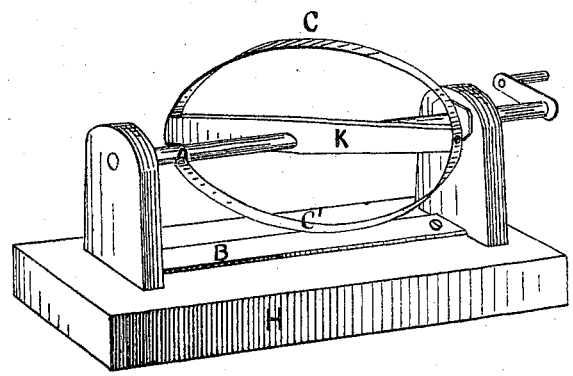
Figure 2:
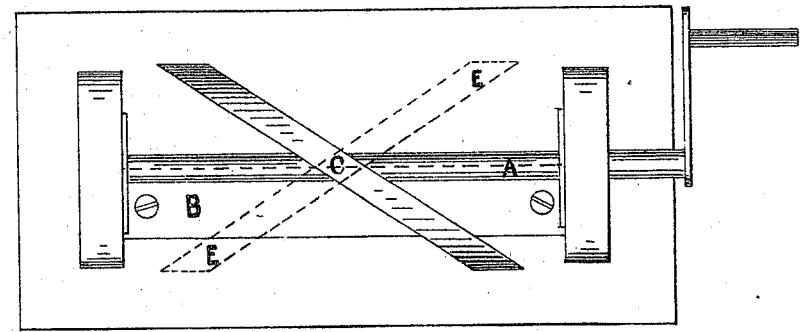

Figure 1 is a perspective view of our invention. Fig. 2 is a plan of the same.

*General Description.*

We construct our invention as follows:

Let H represent a frame, to which we attach our cutting device. This frame will be varied to suit the different uses to which the device is to be put. B is a stationary blade, to be used in case the device is to be applied to cutting grass or shearing hair, wool, &c. The shaft A is parallel to the blade B, and has affixed to it an elliptical cutting-ring, C C', by means of a cross-arm, K. The cutting-ring C C' is a short oblique section, cut from a circular cylinder, the radius of the cylinder being equal to the distance from the center of the shaft A to the cutting-edge of the fixed blade B, and as the centre of the shaft A is coincident with the axis of the cylinder it is evident that some point on the ring C C' will be in contact with the stationary blade, and that as the shaft A is revolved the ring C C' will shear against the stationary cutter.

During one-half of the revolution the cutting will be from right to left along the edge of the stationary cutter, while at the other half of the revolution the cutting will be reversed. This action will be apparent from examination of Fig. 2, the full lines representing the position of the ring at one part of the revolution, the dotted lines *e e* representing the position when the cutting-ring has made a half revolution.

The advantage of this alternate shear is, that the cutting-edge of the stationary blade will hold much better. The cutting-edges being like small saw-teeth it is evident that the shear constantly in one direction will soon smooth off one side of the teeth while an alternating shear will act on both sides of the teeth or projections, thus allowing the stationary blade to maintain a cutting-edge double the length of time. In other words, the ordinary device wears and works in one direction only on the blade, while this device wears and works in both directions.

We claim as our invention—

The combination of the revolving elliptical cutting-ring C C' with the stationary blade B, substantially as described, and for the purpose set forth.

HENRY F. SHAW.
GEORGE F. SHAW.

Witnesses:
  FRANK G. PARKER,
  FRANK H. NUTTER.